3,120,919
STRUCTURE FOR ROTATING SEALS
Frank J. Gardiner, Bryn Mawr, Pa., assignor to I-T-E Circuit Breaker Company, Philadelphia, Pa., a corporation of Pennsylvania
Filed Mar. 20, 1961, Ser. No. 96,787
7 Claims. (Cl. 230—69)

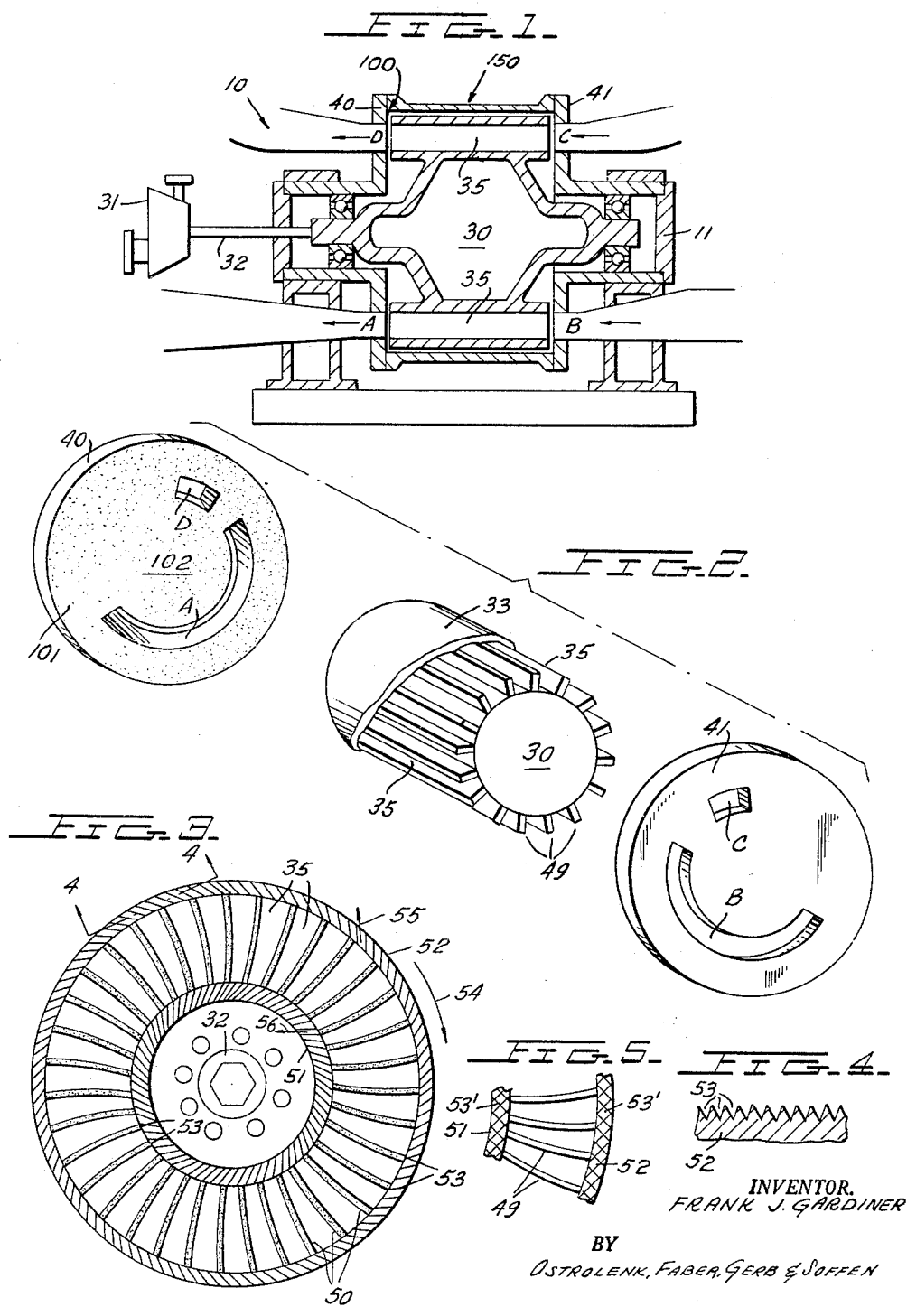

My invention relates to a fluid sealing arrangement between parts moving relatively to each other and more particularly to a sealing arrangement for use in an aerodynamic wave machine.

Mechanisms having elements which move relative to each other and in which a pressure differential existing on opposite sides of the elements must be rigidly maintained, require accurate machining of the elements moving relative to each other, in order to achieve optimum spacing between these elements. Since mechanisms of this type operate at relatively high speeds and at high temperatures, the moving elements of the mechanism experience non-uniform expansions and/or contractions which have a harmful effect upon the spacings between elements.

In aerodynamic wave machines, such as the wave machine disclosed in U.S. Patent No. 2,970,745, entitled "Aerodynamic Wave Machine," filed September 8, 1954, by Max Berchtold, and assigned to the assignee of the instant invention, the high speed rotor described therein contains a plurality of ports which are arranged to channel high velocity gases at high temperatures. The rotor must be arranged to form a tight fit between the rotor and the stator end plates which contain input and output parts which cooperate with the rotor parts. The tight fit is required to prevent the escape of the gases moving between the rotor and the stator plates at places other than the intended rotor and stator input and output ports. Since the aerodynamic wave machine operates at high speeds and high temperatures, the rotor and stator elements experience a certain amount of expansion. This expansion causes the closely fitted elements to come into contact with each other resulting in a friction of the working surfaces. These surfaces may then bind, resulting in the stoppage of the wave machine.

The previous method of overcoming this defect is to machine the working surfaces of the stator and rotor so that they are perfectly flat. The working surfaces are then positioned as close together as possible which experience has shown to be 0.006–0.010 inch in order to minimize air leakage during the operation of the machine. However, an appreciable amount of gas still escaped into the spacing between the working surfaces and it has been found that nearly 50% of all losses occurring in the aerodynamic wave machine can be traced to a leakage occurring between the rotor and stator working surfaces. The clearances between the rotor and stator are relatively large as stated above because the rotor and stator both experience a large amount of distortion during operation due to thermal non-uniformities. The non-uniform expansions of the working surfaces also distort the smooth, even, machined surfaces. It becomes necessary, therefore, to provide sufficient clearance between the working surfaces so that no harmful friction occurs when the stator and rotor working surfaces experience their maximum distortion.

One method of correcting the non-uniform expansion is to machine the stator and rotor working surfaces in such a manner that the surfaces become flat as a result of the non-uniform thermal distortion which they experience. This, however necessitates maching a complicated, irregular surface on the stator and rotor at a time when these elements have not been heated. In addition, it is extremely difficult to determine what irregular surfaces in the unheated condition would give a smooth, flat surface in the distorted condition. Thus, even if it were possible to machine such an irregular surface, it becomes extremely difficult to ascertain just what that surface should be.

Another method of minimizing the gas leakage is to provide the stator and rotor working surfaces with a step-like seal around their circumferences and to provide a honeycomb surface on the areas of the stator and rotor surfaces which are contained within the circumferential areas of the stator and rotor working surfaces. An arrangement of this type is shown in U.S. application No. 643,626, entitled "Fluid Seal for Aerodynamic Wave Machine," filed March 4, 1957, by F. J. Gardiner, and assigned to the assignee of the instant application, now abandoned. It was found, however, that the labyrinth or step-like seal is useful only for providing fluid sealing for circular surfaces thereby preventing the high pressure gases from escaping either inwardly or outwardly in the radial direction while permitting the gases to escape in the concentric direction. The honeycomb surface has been found to have only limited effectiveness in the prevention of leakage occurring in the concentric or tangential direction and has the further disadvantage of being expensive to apply to the working surfaces.

The arrangement of my invention provides a highly effective seal to prevent the escape of gases in both the radial and the tangential directions while having the advantage of being relatively inexpensive to apply to the stator and rotor working surfaces.

My invention is comprised of stators having working surfaces which are sprayed with metal oxides which are fairly abradable and yet have a high resistance to heat, erosion, etc. The inner hub and outer rim of the rotor working surfaces are then machined to provide a knurled or file-like surface. As the aerodynamic wave machine is building up to its normal operating temperature, the expansion which the stator and rotor experience causes the abradable metallic oxide coatings to be rubbed off the stator end plates by the knurled surface and the rotor blades. The knurled surfaces of the rotor further provide means by which the metallic oxide particles which have been rubbed off may escape and be permanently removed from the working surfaces rather than being redeposited in a cumulative fashion, thereby avoiding any serious rubbing or binding between working surfaces. The design of the knurled surface is arranged to carry the abraded particles away from the ports so as not to interfere with the movement of the gases or to contaminate them. The fluid sealing means provides a very effective seal which retains optimum spacing especially after the aerodynamic wave machine has reached its normal operating temperature and speed.

It is, therefore, one object of my invention to provide a novel sealing means between working surfaces which is so arranged as to prevent both radial and tangential escape of the high pressure gases contained therein.

Still another object of my invention is to provide a fluid seal arrangement for an aerodynamic wave machine having an abrading surface which is designed to move abraded particles away from the rotor and stator ports to prevent comingling of the particles with the gases contained therein.

Another object of my invention is to provide a fluid seal means between two working surfaces including novel means to remove abraded particles evenly from the working surfaces.

Another object of my invention is to provide a fluid seal means for an aerodynamic wave machine having novel abrading and abraded surfaces which cooperate to compensate for the non-uniform expansion of the moving elements.

Still another object of my invention is to provide a novel seal means for an aerodynamic wave machine by providing an abradable working surface and a cooperating knurled working surface.

These and other objects of my invention will become apparent after reading the following description and the accompanying drawings, in which:

FIGURE 1 is a schematic view of an aerodynamic wave machine utilizing my novel fluid seal means.

FIGURE 2 is an exploded view of a rotor and the end plates of the stator shown in FIGURE 1.

FIGURE 3 is an end view of the rotor shown in FIGURE 2.

FIGURE 4 is a cross-sectional view of the knurled surface of FIGURE 3 taken along phantom line 4—4'.

FIGURE 5 shows another embodiment of the invention.

Referring now to the drawings, FIGURES 1 and 2 show an aerodynamic wave machine 10 which is more fully described in U.S. Patent No. 2,970,745, issued February 7, 1961, which is comprised of stator 11 wherein a rotor 30 is mounted for rapid rotation about its axis in any suitable manner, as for example, by a turbine 31 connected to rotor 30 through shaft 32. The rotor 30 is a drum having an outer shell 33 and a plurality of radial vanes 49 which form a plurality of ports or channels 35 extending more or less parallel to the axis of the rotor 30 and adjacent the periphery thereof.

Two stator end plates 40 and 41 are placed on opposite ends of the rotor 30 in the closest proximity thereto consistent with high speed rotation required in the rotor and to obtain the best possible fluid type seal between the rotor 30 and stator end plates 40 and 41. The plate 41 on the input side of the rotor is provided with a port C for the input of hot gas from the combustion chamber 70 and elevated temperature and pressure and port B for the input of cold gas. End plate 40 on the exhaust end of the rotor is provided with port D for the exhaust of hot gases at elevated pressure and port A for the exhaust of hot gases at ambient pressure. The exhaust at port D may be passed through a diffuser (not shown) with part of the exhaust being used for power purposes and the remainder being used for feed back to the rotor 30 at high temperatures. The temperature is raised at substantially constant pressure in a combustion chamber or heat exchanger (not shown) from which point it is fed into channels 35 at input port C. Rotor 30 is rotated at high speed to produce the required timing for the shock waves and gas interphases with respect to the ports A, B, C and D.

The fluid seal 100 between the rotor 30 and the end plate 40 is comprised of a metallic oxide coating 101 which is applied to the working surface 102 of stator end plate 40. The metallic oxide is placed on the working surface 102 of end plate 40 in any suitable manner such as hot spraying. The working surface (not shown) of the stator end plate 41 is coated with a metallic oxide in the same manner as stator plate 41. The metallic oxide employed may contain aluminum, zirconium or other more exotic metals. These oxides are sprayed in such density as to be abradable while maintaining high resistance to heat and erosion.

The circular surfaces 51 and 52 on both ends of rotor 30 are machined in any well known manner to form a knurled surface such as that shown in FIGURE 4. Either diamond or tile patterned knurl 53', such as that shown in FIGURE 5 may be used.

When the rotor 30 is rotated at high speeds by turbine 31 and when the hot gases are introduced into the channels or ports 35 of rotor 30, the aerodynamic wave machine 10 experiences a certain amount of expansion due to the heat developed therein. This expansion causes the working surfaces 101 of the stator and 50, 51 and 52 of the rotor to come in contact with one another. The end surfaces 50 of the rotor vanes 49 come in contact with the adjacent region of the working surface 101 causing the abradable metallic oxide coating to be rubbed off.

The abraded particles removed between the knurled surfaces 51 and 52 of rotor 30 and the adjacent areas on stator end plates 40 and 41, however, have a tendency to accumulate causing an undue amount of rubbing which may lead to stoppage of the wave machine. The knurled surfaces 51 and 52 of rotor 30, however, prevent accumulations of this nature since the tiny grooves 53 in the knurled surfaces 51 and 52 act to provide regions in which the abraded particles may be distributed and allowed to escape assisted by the gas flow and centrifugal force, thus preventing any accumulation of the abraded particles. More specifically, knurled surface 52 directs the particles outwardly (as shown by arrow 55), while knurled surface 51 directs the particles inwardly (as shown by arrow 56); the free particles then being removed through exhaust port A. The gas flow about passages 51, 52, necessary to assist in the particle removal, is of such a minute quantity as to introduce negligible seal leakage thereby. The grooves 53 of circular surfaces 51 and 52 are so aligned as to be transverse to the direction of adjacent radial vanes 49. The metallic oxide particles which are removed by knurled surfaces 52 and 51 are channeled outwardly and inwardly respectively (as shown by arrows 55 and 56) from the ports 35 under the influence of the high pressure gases passing through channels 35 and ports A through D, thereby preventing the abraded particles from entering the ports 35 to comingle with and contaminate the gases passing therethrough. This arrangement provides an optimum fluid seal arrangement while preventing the gases from being mixed with the undesirable abraded particles. Initial running of the wave machine in the workshop serves to initiate abrading.

Abrasion continues until the aerodynamic wave machine reaches its normal operating temperatures at a shop test stand at which time no more abrasion will occur. The amount of abrasion which takes place acts to compensate for the non-uniform expansion which the stator and rotor experience thereby providing spacing between the stator and rotor which is large enough to permit free running of the rotor 30 and yet small enough to reduce gas leakage to a negligible amount. Future operation of the machine causes no additional abrasion.

The surfaces having the metallic oxide coating may be readily resprayed with the metallic oxide if the wave machine is operated at any time under unusually high temperature conditions. This is done simply by removing the stator end plates 40 and 41.

The knurled surfaces act to facilitate abrasion so well that it is possible to design the wave machine without placing a metallic oxide coating on the stator end plates.

It can be seen from the foregoing that I have provided a fluid seal arrangement which guarantees optimum spacing between the working surfaces of parts which move with respect to each other and which does not appreciably affect the running speeds of the moving parts.

In the foregoing, I have described my invention only in connection with preferred embodiments thereof. Many variations and modifications of the principles of my invention within the scope of the description herein are obvious. Accordingly, I prefer to be bound not by the specific disclosure herein but only by the appending claims.

I claim:

1. A fluid seal arrangement for preventing radial and tangential fluid flow between at least one of two end plates and a high speed rotor positioned therebetween and axially spaced therefrom, said rotor and said end plates each having cooperating ports, said fluid seal comprising an abradable surface and an abrading surface, the rotative engagement of said abrading and abradable surfaces causing particles to be released from said abradable surface; the extent of said particle release defined by the extent of said rotative engagement; the release of said particles establishing a non-contact relationship between said abrading and abradable surfaces, said abrading surface including passages arranged to permit particles rubbed from said abradable surface to be carried away from said engaged abrading and abradable surfaces, said abradable surface being a metallic oxide coating.

2. A fluid seal arrangement for preventing radial and tangential fluid flow between at least one of two end plates and a high speed rotor positioned therebetween and axially spaced therefrom, said rotor and said end plates each having cooperating ports, said fluid seal comprising an abradable surface and an abrading surface, the rotative engagement of said abrading and abradable surfaces causing particles to be released from said abradable surface; the extent of said particle release defined by the extent of said rotative engagement; the release of said particles establishing a non-contact relationship between said abrading and abradable surfaces, said abrading surface being arranged to permit particles rubbed from said abradable surface to be carried away from said engaged abrading and abradable surfaces, said abrading surface having a plurality of spaced, substantially parallel grooves, each of said grooves being offset from a straight line passing normal to the radius of said rotor.

3. A fluid seal in combination with an aerodynamic wave machine; said machine comprising a high speed rotor rotatably mounted between two stationary end plates; said rotor having two plane surfaces at opposite ends, each end being positioned in close proximity to its associate stationary end plate, said end plates having a plurality of ports, said rotor having a plurality of channels extending longitudinally through said rotor, said stationary end plates being coated with an abradable material, the rotative engagement of said rotor end surfaces and said abradable material coating causing particles to be released from said abradable coating; the extent of said particle release defined by the extent of such rotative engagement; the release of said particles establishing a non-contact relationship between said end plates and said rotor end surfaces; said rotor ends having a knurled surface for removing abraded particles from said end plates, said cooperating surfaces forming a seal which prevents fluid leakage in both the radial and the tangential direction, said knurled surface having a plurality of grooves arranged in spaced parallel relationship, each of said grooves being offset from a radial line of said rotor.

4. A fluid seal in combination with an aerodynamic wave machine; said machine comprising a high speed rotor rotatably mounted between two stationary end plates; said rotor being comprised of a cylindrical core, an outer shell concentric to said central core and a plurality of vanes extending radially between said core and said outer shell, said stationary end plates having a plurality of ports, said vanes forming a plurality of channels cooperating with said ports to alternately permit and prevent the passage of fluids therethrough, the ends of said rotor being positioned in close proximity to their stationary end plates, said end plates having an abradable surface adjacent said rotor, the rotative engagement of said rotor end surfaces and said abradable surface causing particles to be released from said abradable coating; the extent of said particle release defined by the extent of such rotative engagement; the release of said particles establishing a non-contact relationship between said end plates and said rotor end surfaces; said rotor ends each having a knurled surface cooperating with their associated abradable surfaces to form an optimum fluid seal therebetween, said knurled surface providing passages to evenly distribute and remove abraded particles formed during rotation from between said rotor end and abradable end plate surfaces, to prevent said machine from binding.

5. The combination as set forth in claim 4, wherein each of said rotor and knurled surfaces includes first and second passages, positioned at said cylindrical core and outer seal respectively; said first passages directing the abraded particles inwardly and said second passages directing the abraded particles outwardly.

6. The combination as set forth in claim 4, wherein said first and second passages comprise a plurality of grooves arranged in spaced parallel relationship; each of the grooves of said first passages being offset in a first direction from a radial line of said motor; each of the grooves of said second passages being offset in a second direction from a radial line of said motor.

7. A fluid seal arrangement for preventing radial and tangential fluid flow between at least one of two end plates and a high speed rotor positioned therebetween and axially spaced therefrom, said rotor and said end plates each having cooperating ports, said fluid seal comprising an abradable surface and an abrading surface, having a first sealing surface about the central region and a second sealing surface about the peripheral region thereof, the rotative engagement of said abrading and abradable surfaces causing particles to be released from said abradable surface, the extent of said particle release defined by the extent of said rotative engagement, the release of said particles establishing a non-contact relationship between said abrading and abradable surfaces, said abrading surface being arranged to permit particles rubbed from said abradable surface to be carried away from said engaged abrading and abradable surfaces, said abrading surface having a plurality of spaced, substantially parallel grooves, each of the grooves of said first sealing surface being offset in a first direction from a straight line passing normal to the radius of said rotor, and each of the grooves of said second sealing surface being offset in a second direction from a straight line passing normal to the radius of said rotor, whereby the grooves of said first sealing surface direct the abraded particles inwardly and the grooves of said second sealing surface direct the particles outwardly.

References Cited in the file of this patent

UNITED STATES PATENTS

| | | |
|---|---|---|
| 2,404,816 | Snyder | July 30, 1946 |
| 2,492,935 | McCulloch et al. | Dec. 27, 1949 |
| 2,644,729 | Bailey | July 7, 1953 |
| 2,766,928 | Jendrassik | Oct. 16, 1956 |
| 2,963,307 | Bobo | Dec. 6, 1960 |
| 2,970,745 | Berchtold | Feb. 7, 1961 |